United States Patent
Rovniaguin et al.

(10) Patent No.: US 9,985,976 B1
(45) Date of Patent: *May 29, 2018

(54) METHODS FOR IDENTIFYING NETWORK TRAFFIC CHARACTERISTICS TO CORRELATE AND MANAGE ONE OR MORE SUBSEQUENT FLOWS AND DEVICES THEREOF

(71) Applicant: F5 Networks Inc., Seattle, WA (US)

(72) Inventors: Dmitry Rovniaguin, Rishon Le Zion (IL); Ephraim Dan, Yad-Binyamin (IL); Ron Talmor, Tel Aviv (IL)

(73) Assignee: F5 Networks, Inc., Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/012,458

(22) Filed: Feb. 1, 2016

Related U.S. Application Data (63) Continuation of application No. 13/341,360, filed on Dec. 30, 2011, now Pat. No. 9,270,766.

(51) Int. Cl.
*G06F 21/00* (2013.01)
*H04L 29/06* (2006.01)
*H04L 29/08* (2006.01)

(52) U.S. Cl.
CPC ...... *H04L 63/1408* (2013.01); *H04L 63/1433* (2013.01); *H04L 63/20* (2013.01);
(Continued)

(58) Field of Classification Search
CPC . H04L 63/1408; H04L 63/1416; H04L 63/20; H04L 67/2819
See application file for complete search history.

(56) References Cited

U.S. PATENT DOCUMENTS

| 3,950,735 A | 4/1976 | Patel |
| 4,644,532 A | 2/1987 | George et al. |

(Continued)

FOREIGN PATENT DOCUMENTS

| EP | 0744850 A2 | 11/1996 |
| EP | 2244418 A1 | 10/2010 |

(Continued)

OTHER PUBLICATIONS

May 11, 2016—Taiwan Office Action for corresponding Taiwan Patent Application No. 101145417, pp. 1-11.

(Continued)

*Primary Examiner* — Maung Lwin
(74) *Attorney, Agent, or Firm* — LeClairRyan, a Professional Corporation (57) ABSTRACT

A method, non-transitory computer readable medium, and device that identifies network traffic characteristics to correlate and manage one or more subsequent flows includes transmitting a monitoring request comprising one or more attributes extracted from an HTTP request received from a client computing device and a timestamp to a monitoring server to correlate one or more subsequent flows associated with the HTTP request. The HTTP request is transmitted to an application server after receiving an acknowledgement response to the monitoring request from the monitoring server. An HTTP response to the HTTP request is received from the application server. An operation with respect to the HTTP response is performed.

16 Claims, 5 Drawing Sheets

(52) U.S. Cl.
CPC .......... *H04L 67/02* (2013.01); *H04L 67/2819* (2013.01); *H04L 67/42* (2013.01); *H04L 2463/121* (2013.01)

(56) References Cited

U.S. PATENT DOCUMENTS

| | | | |
|---|---|---|---|
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,480,476 B1 | 11/2002 | Willars |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,708,187 B1 | 3/2004 | Shanumgam et al. |
| 6,718,380 B1 | 4/2004 | Mohaban et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,975,592 B1 | 12/2005 | Seddigh et al. |
| 6,986,040 B1 | 1/2006 | Kramer et al. |
| 6,987,763 B2 | 1/2006 | Rochberger et al. |
| 7,007,092 B2 | 2/2006 | Peiffer |
| 7,058,633 B1 | 6/2006 | Gnagy et al. |
| 7,113,993 B1 | 9/2006 | Cappiello et al. |
| 7,133,944 B2 | 11/2006 | Song et al. |
| 7,139,792 B1 | 11/2006 | Mishra et al. |
| 7,185,359 B2 | 2/2007 | Schmidt et al. |
| 7,228,422 B2 | 6/2007 | Morioka et al. |
| 7,280,971 B1 | 10/2007 | Wimberly et al. |
| 7,287,082 B1 | 10/2007 | O'Toole, Jr. |
| 7,295,827 B2 | 11/2007 | Liu et al. |
| 7,308,703 B2 | 12/2007 | Wright et al. |
| 7,308,709 B1 | 12/2007 | Brezak et al. |
| 7,310,339 B1 | 12/2007 | Powers et al. |
| 7,319,696 B2 | 1/2008 | Inoue et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,383,570 B2 | 6/2008 | Pinkas et al. |
| 7,398,552 B2 | 7/2008 | Pardee et al. |
| 7,433,962 B2 | 10/2008 | Janssen et al. |
| 7,437,478 B2 | 10/2008 | Yokota et al. |
| 7,454,480 B2 | 11/2008 | Labio et al. |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,558,197 B1 | 7/2009 | Sindhu et al. |

(56) References Cited

U.S. PATENT DOCUMENTS

| | | |
|---|---|---|
| 7,590,732 B2 | 9/2009 | Rune |
| 7,624,424 B2 | 11/2009 | Morita et al. |
| 7,644,137 B2 | 1/2010 | Bozak et al. |
| 7,668,166 B1 | 2/2010 | Rekhter et al. |
| 7,689,710 B2 | 3/2010 | Tang et al. |
| 7,724,657 B2 | 5/2010 | Rao et al. |
| 7,725,093 B2 | 5/2010 | Sengupta et al. |
| 7,778,187 B2 | 8/2010 | Chaturvedi et al. |
| 7,801,978 B1 | 9/2010 | Susai et al. |
| 7,808,913 B2 | 10/2010 | Ansari et al. |
| 7,831,662 B2 | 11/2010 | Clark et al. |
| 7,908,314 B2 | 3/2011 | Yamaguchi et al. |
| 7,925,908 B2 | 4/2011 | Kim |
| 7,930,365 B2 | 4/2011 | Dixit et al. |
| 7,933,946 B2 | 4/2011 | Livshits et al. |
| 7,945,908 B1 | 5/2011 | Waldspurger et al. |
| 7,984,141 B2 | 7/2011 | Gupta et al. |
| 8,103,781 B1 | 1/2012 | Wu et al. |
| 8,130,650 B2 | 3/2012 | Allen, Jr. et al. |
| 8,189,567 B2 | 5/2012 | Kavanagh et al. |
| 8,199,757 B2 | 6/2012 | Pani et al. |
| 8,205,246 B2 | 6/2012 | Shatzkamer et al. |
| 8,239,954 B2 | 8/2012 | Wobber et al. |
| 8,274,895 B2 | 9/2012 | Rahman et al. |
| 8,321,908 B2 | 11/2012 | Gai et al. |
| 8,351,333 B2 | 1/2013 | Rao et al. |
| 8,380,854 B2 | 2/2013 | Szabo |
| 8,417,817 B1 | 4/2013 | Jacobs |
| 8,447,871 B1 | 5/2013 | Szabo |
| 8,447,970 B2 | 5/2013 | Klein et al. |
| 8,464,265 B2 | 6/2013 | Worley |
| 8,468,267 B2 | 6/2013 | Yigang |
| 8,539,224 B2 | 9/2013 | Henderson et al. |
| 8,566,474 B2 | 10/2013 | Kanode et al. |
| 8,578,050 B2 | 11/2013 | Craig et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,969 B2 | 3/2014 | Kay |
| 8,701,179 B1 | 4/2014 | Penno et al. |
| 8,725,836 B2 | 5/2014 | Lowery et al. |
| 8,726,336 B2 | 5/2014 | Narayanaswamy et al. |
| 8,737,304 B2 | 5/2014 | Karuturi et al. |
| 8,778,665 B2 | 7/2014 | Gilde et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,819,768 B1 | 8/2014 | Koeten et al. |
| 8,830,874 B2 | 9/2014 | Cho et al. |
| 8,873,753 B2 | 10/2014 | Parker |
| 8,875,274 B2 | 10/2014 | Montemurro et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 9,037,166 B2 | 5/2015 | De Wit et al. |
| 9,077,554 B1 | 7/2015 | Szabo |
| 9,083,760 B1 | 7/2015 | Hughes et al. |
| 2001/0009554 A1 | 7/2001 | Katseff et al. |
| 2001/0023442 A1 | 9/2001 | Masters |
| 2002/0010783 A1 | 1/2002 | Primak et al. |
| 2002/0032777 A1 | 3/2002 | Kawata et al. |
| 2002/0049842 A1 | 4/2002 | Huetsch et al. |
| 2002/0059428 A1 | 5/2002 | Susai et al. |
| 2002/0083067 A1 | 6/2002 | Tamayo et al. |
| 2002/0112061 A1 | 8/2002 | Shih et al. |
| 2002/0138615 A1* | 9/2002 | Schmeling ............... H04L 67/02 709/225 |
| 2002/0161913 A1 | 10/2002 | Gonzalez et al. |
| 2002/0194342 A1 | 12/2002 | Lu et al. |
| 2002/0198993 A1 | 12/2002 | Cudd et al. |
| 2003/0037070 A1 | 2/2003 | Marston |
| 2003/0046291 A1 | 3/2003 | Fascenda |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0086415 A1 | 5/2003 | Bernhard et al. |
| 2003/0105983 A1 | 6/2003 | Brakmo et al. |
| 2003/0108052 A1 | 6/2003 | Inoue et al. |
| 2003/0128708 A1 | 7/2003 | Inoue et al. |
| 2003/0140140 A1 | 7/2003 | Lahtinen |
| 2003/0145062 A1 | 7/2003 | Sharma et al. |
| 2003/0145233 A1 | 7/2003 | Poletto et al. |
| 2003/0163576 A1 | 8/2003 | Janssen et al. |
| 2003/0225485 A1 | 12/2003 | Fritz et al. |
| 2003/0233468 A1* | 12/2003 | Lee ..................... H04N 1/00222 709/236 |
| 2004/0003287 A1 | 1/2004 | Zissimopoulos et al. |
| 2004/0072569 A1 | 4/2004 | Omae et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0141185 A1 | 7/2004 | Hill |
| 2004/0192312 A1 | 9/2004 | Li et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0027869 A1 | 2/2005 | Johnson |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0078604 A1 | 4/2005 | Yim |
| 2005/0122977 A1 | 6/2005 | Lieberman |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0188423 A1* | 8/2005 | Motsinger ........... H04L 63/0876 726/22 |
| 2005/0198310 A1 | 9/2005 | Kim et al. |
| 2005/0262238 A1 | 11/2005 | Reeves et al. |
| 2006/0031520 A1 | 2/2006 | Bedekar et al. |
| 2006/0059267 A1 | 3/2006 | Cugi et al. |
| 2006/0077902 A1 | 4/2006 | Kannan et al. |
| 2006/0095573 A1* | 5/2006 | Carle ..................... H04L 63/02 709/227 |
| 2006/0112176 A1 | 5/2006 | Liu et al. |
| 2006/0112272 A1 | 5/2006 | Morioka et al. |
| 2006/0129684 A1 | 6/2006 | Datta |
| 2006/0135198 A1 | 6/2006 | Lee |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0209853 A1 | 9/2006 | Hidaka et al. |
| 2006/0230148 A1 | 10/2006 | Forecast et al. |
| 2006/0233106 A1 | 10/2006 | Achlioptas et al. |
| 2006/0242300 A1 | 10/2006 | Yumoto et al. |
| 2007/0006293 A1 | 1/2007 | Balakrishnan et al. |
| 2007/0016662 A1 | 1/2007 | Desai et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0118879 A1 | 5/2007 | Yeun |
| 2007/0124806 A1* | 5/2007 | Shulman ................. H04L 63/08 726/5 |
| 2007/0136312 A1* | 6/2007 | Shulman ........... G06F 17/30477 |
| 2007/0174491 A1 | 7/2007 | Still et al. |
| 2007/0220598 A1 | 9/2007 | Salowey et al. |
| 2007/0233809 A1 | 10/2007 | Brownell et al. |
| 2007/0297410 A1 | 12/2007 | Yoon et al. |
| 2007/0297551 A1 | 12/2007 | Choi |
| 2007/0299969 A1* | 12/2007 | Kunitake .......... G06F 17/30011 709/225 |
| 2008/0016212 A1* | 1/2008 | Do ....................... H04L 63/0245 709/225 |
| 2008/0025297 A1 | 1/2008 | Kashyap |
| 2008/0034136 A1 | 2/2008 | Ulenas |

(56) References Cited

U.S. PATENT DOCUMENTS

| | | |
|---|---|---|
| 2008/0072303 A1 | 3/2008 | Syed |
| 2008/0120370 A1 | 5/2008 | Chan et al. |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0178278 A1 | 7/2008 | Grinstein et al. |
| 2008/0201599 A1 | 8/2008 | Ferraiolo et al. |
| 2008/0205613 A1 | 8/2008 | Lopez |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0253395 A1 | 10/2008 | Pandya |
| 2008/0256224 A1 | 10/2008 | Kaji et al. |
| 2008/0275843 A1* | 11/2008 | Lal ................. G06F 21/6227 |
| 2008/0288661 A1 | 11/2008 | Galles |
| 2008/0301760 A1 | 12/2008 | Lim |
| 2009/0028337 A1 | 1/2009 | Balabine et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0094610 A1 | 4/2009 | Sukirya |
| 2009/0100518 A1 | 4/2009 | Overcash |
| 2009/0119504 A1 | 5/2009 | Van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0196282 A1 | 8/2009 | Fellman et al. |
| 2009/0228956 A1 | 9/2009 | He et al. |
| 2009/0287935 A1 | 11/2009 | Aull et al. |
| 2009/0296624 A1 | 12/2009 | Ryu et al. |
| 2009/0300407 A1 | 12/2009 | Kamath et al. |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0071048 A1 | 3/2010 | Novak et al. |
| 2010/0115236 A1 | 5/2010 | Bataineh et al. |
| 2010/0122091 A1 | 5/2010 | Huang et al. |
| 2010/0150154 A1 | 6/2010 | Viger et al. |
| 2010/0278733 A1 | 7/2010 | Shukla et al. |
| 2010/0242092 A1 | 9/2010 | Harris et al. |
| 2010/0251330 A1 | 9/2010 | Kroeselberg et al. |
| 2010/0322250 A1 | 12/2010 | Shetty et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0066718 A1 | 3/2011 | Susai et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0246800 A1 | 10/2011 | Accpadi et al. |
| 2011/0273984 A1 | 11/2011 | Hsu et al. |
| 2011/0282997 A1 | 11/2011 | Prince et al. |
| 2011/0295924 A1* | 12/2011 | Morris .................. H04L 67/02 |
| | | 709/202 |
| 2011/0321122 A1 | 12/2011 | Mwangi et al. |
| 2012/0016994 A1 | 1/2012 | Nakamura et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0101952 A1 | 4/2012 | Raleigh et al. |
| 2012/0191847 A1 | 7/2012 | Nas et al. |
| 2012/0311153 A1 | 12/2012 | Morgan |
| 2012/0317266 A1 | 12/2012 | Abbott |
| 2013/0029726 A1 | 1/2013 | Berionne et al. |
| 2013/0091002 A1 | 4/2013 | Christie et al. |
| 2013/0198322 A1 | 8/2013 | Oran et al. |
| 2013/0336122 A1 | 12/2013 | Baruah et al. |
| 2014/0025823 A1 | 1/2014 | Szabo et al. |
| 2014/0095661 A1 | 1/2014 | Knowles et al. |
| 2014/0040478 A1 | 2/2014 | Hsu et al. |
| 2014/0269484 A1 | 9/2014 | Dankberg et al. |
| 2014/0317404 A1 | 10/2014 | Carlson et al. |

FOREIGN PATENT DOCUMENTS

| | | |
|---|---|---|
| GB | 2448071 A | 1/2008 |
| JP | 2005-010913 A | 1/2005 |
| JP | 2008-257738 A | 10/2008 |
| JP | 2011-188071 A | 9/2011 |
| JP | 2011-238263 A | 11/2011 |
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

Apr. 13, 2016—Japanese Office Action for corresponding Japan Application No. 2014-550426, pp. 1-2.

"A Process for Selective Routing of Servlet Content to Transcoding Modules," Research Disclosure 422124, Jun. 1999, pp. 889-890, IBM Corporation.

F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.

Crescendo Networks, "Application Layer Processing (ALP)," 2003-2009, pp. 168-186, Chapter 9, CN-5000E/5500E, Foxit Software Company.

Fielding et al., "Hypertext Transfer Protocol—http/1.1," Network Working Group, RFC: 2068, Jan. 1997, pp. 1-162.

Fielding et al., "Hypertext Transfer Protocol—http/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Williams et al., "Forwarding Authentication," The Ultimate Windows Server 2003 System Administrator's Guide, 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

MacVittie, Lori, "Message-Based Load Balancing," Technical Brief, Jan. 2010, pp. 1-9, F5 Networks, Inc.

International Search Report for International Patent Application No. PCT/US2012/071648 (dated May 27, 2013).

F5 Networks Inc., "Configuration Guide for Local Traffic Management", F5 Networks Inc., Jan. 2006, version 9.2.2, 406 pgs.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

(56) References Cited

OTHER PUBLICATIONS

OWASP, "Testing for Cross site scripting", OWASP Testing Guide v2, Table of Contents, Feb. 24, 2011, pp. 1-5, (www.owasp.org/index.php/Testing_for_Cross_site_scripting).
China Office Action for Corresponding Application No. 201280070784.4, dated Dec. 6, 2016, pp. 1-15.
China Office Action for corresponding China Application No. 201280070784.4, dated Jul. 7, 2017, pp. 1-9.

* cited by examiner

METHODS FOR IDENTIFYING NETWORK TRAFFIC CHARACTERISTICS TO CORRELATE AND MANAGE ONE OR MORE SUBSEQUENT FLOWS AND DEVICES THEREOF

This application is a continuation of prior U.S. patent application Ser. No. 13/341,360, filed Dec. 30, 2011, which is herein incorporated by reference.

FIELD

This technology relates to methods for identifying network traffic characteristics to correlate and manage one or more subsequent flows and devices thereof.

BACKGROUND

As enterprise customers deploy more web-based database applications, IT administrators face several challenges for correlating and managing subsequent flows. For example, IT administrators would like to provide a data access audit trail which is not always possible. Additionally, IT administrators would like to be able to monitor and effectively alert or terminate a user session deemed to be misbehaving based on a data or other access policy. Further, IT administrators would like to secure both application and database environments from threats, such as http://www.f5.com/glossary/distributed-denial-of-service-attack.html SQL injection and cross-site scripting attacks.

SUMMARY

A method for identifying network traffic characteristics to correlate and manage one or more subsequent flows includes transmitting, by a traffic management computing device, a monitoring request comprising one or more attributes extracted from an HTTP request received from a client computing device and a timestamp to a monitoring server to correlate one or more subsequent flows associated with the HTTP request. The HTTP request is transmitted, by the traffic management computing device, to an application server after receiving an acknowledgement response to the monitoring request from the monitoring server. An HTTP response to the HTTP request is received, by the traffic management computing device, from the application server. An operation with respect to the HTTP response is performed, by the traffic management computing device, after transmitting a monitoring response message to end the correlation associated with the HTTP request in response to the monitoring request.

A non-transitory computer readable medium having stored thereon instructions for identifying network traffic characteristics to correlate and manage one or more subsequent flows comprising machine executable code which when executed by at least one processor, causes the processor to perform steps including transmitting a monitoring request comprising one or more attributes extracted from an HTTP request received from a client computing device and a timestamp to a monitoring server to correlate one or more subsequent flows associated with the HTTP request. The HTTP request is transmitted to an application server after receiving an acknowledgement response to the monitoring request from the monitoring server. An HTTP response to the HTTP request is received from the application server. An operation with respect to the HTTP response is performed.

A traffic management computing device includes a memory coupled to one or more processors which are configured to execute programmed instructions stored in the memory including transmitting a monitoring request comprising one or more attributes extracted from an HTTP request received from a client computing device and a timestamp to a monitoring server to correlate one or more subsequent flows associated with the HTTP request. The HTTP request is transmitted to an application server after receiving an acknowledgement response to the monitoring request from the monitoring server. An HTTP response to the HTTP request is received from the application server. An operation with respect to the HTTP response is performed.

This technology provides a number of advantages including providing effective methods, non-transitory computer readable medium, and devices that identify network traffic characteristics to correlate and manage one or more subsequent flows. With this technology, access audit trails can be generated that are granular at the data level and also tie in attributes from the web application layer. Additionally, this technology can monitor and effectively alert or terminate a user session deemed to be misbehaving based on a data access policy. Further, this technology helps to secure both application and database environments from threats, such as http://www.f5.com/glossary/distributed-denial-of-service-attack.html SQL injection and cross-site scripting attacks.

DETAILED DESCRIPTION

Figure 1:
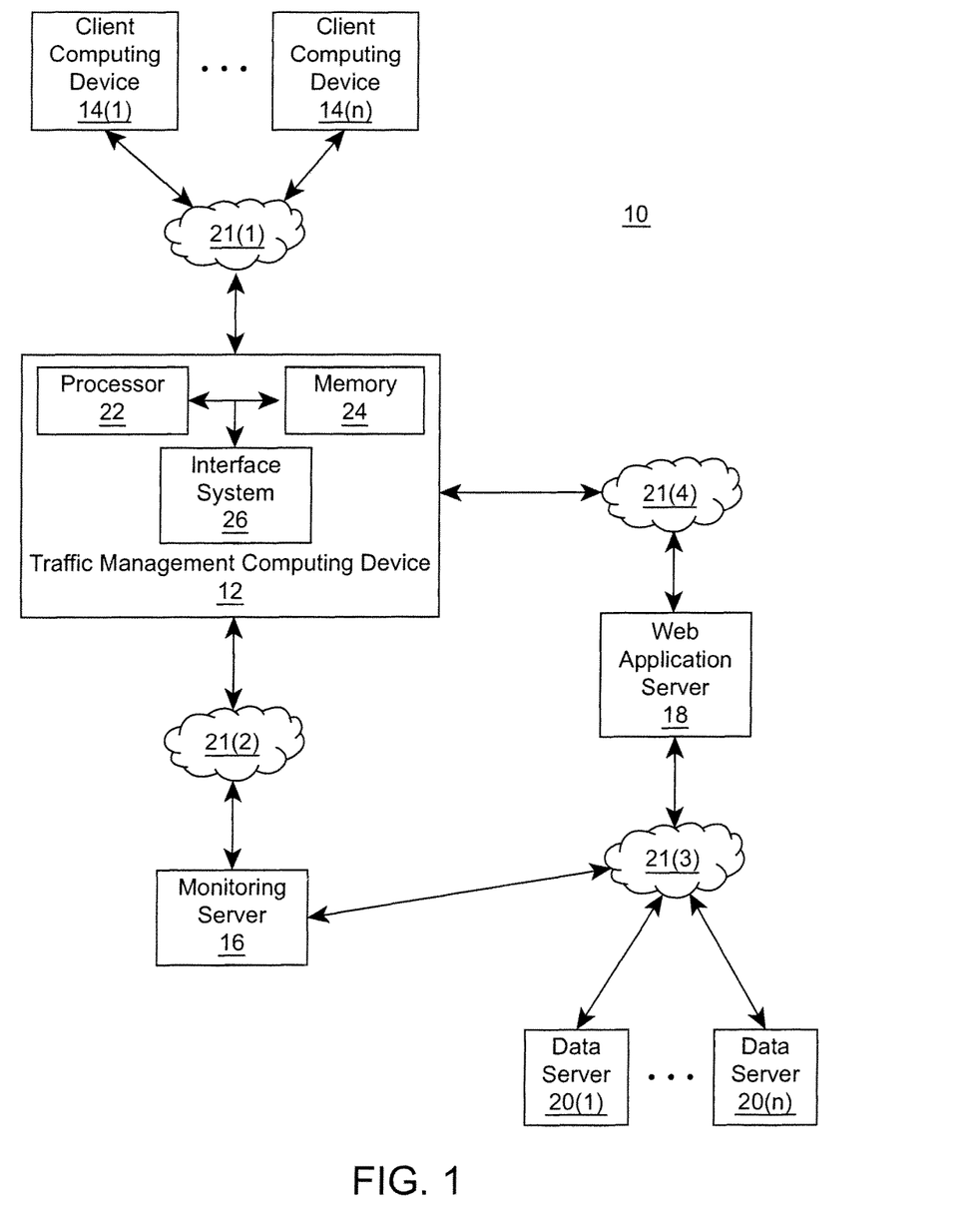
FIG. 1 is an environment with an exemplary traffic management computing device that identifies network traffic characteristics to correlate and manage one or more subsequent flows.

An environment 10 with an exemplary traffic management computing device that identifies network traffic characteristics to correlate and manage one or more subsequent flows is illustrated in FIG. 1. The environment 10 includes a traffic management computing device 12, a plurality of client computing devices 14(1)-14(n), a database monitoring server 16, a web application server 18, and data servers 20(1)-20(n) which are all coupled together by one or more communication networks 21(1)-21(4), although this environment can include other numbers and types of systems, devices, components, and elements in other configurations. This technology provides a number of advantages including providing effective methods, non-transitory computer readable medium, and devices that identify network traffic characteristics to correlate and manage one or more subsequent flows, such as request and/or response flows.

The traffic management computing device 12 provides a number of functions as illustrated and described with the examples herein including identifying network traffic characteristics to correlate and manage one or more subsequent flows, although other numbers and types of systems can be used and other numbers and types of functions can be performed. In this example, the traffic management computing device 12 includes a central processing unit (CPU) or processor 22, a memory 24, and an interface system 26 which are coupled together by a bus or other link, although other numbers and types of systems, devices, components, and elements in other configurations production data storage device 16, and a backup data storage device 18 and locations can be used. The processor 22 executes a program of stored instructions for one or more aspects of the present technology as described and illustrated by way of the examples herein, although other types and numbers of processing devices and logic could be used and the processor 22 could execute other numbers and types of programmed instructions.

The memory 24 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 22, can be used for the memory 24.

In this example, the interface system 26 in the traffic management computing device 12 is used to operatively couple and communicate between the traffic management computing device 12 and the plurality of client computing devices 14(1)-14(n), the database monitoring server 16, and the web application server 18, which are all coupled together by one or more communication networks 21(1), 21(2), and 21(4), although other types and numbers of communication networks or systems with other types and numbers of connections and configurations to other devices and elements, such as communication network 21(3) to communicate with data servers 20(1)-20(n) could be used. In this illustrative example, application, web application server 18 is coupled to data servers 20(1)-20(n) via communication network 20(3). Additionally, by way of example only, the one or more the communications networks can use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used. In the exemplary environment 10 shown in FIG. 1, three communication networks 21(1)-21(4) are illustrated, although other numbers and types could be used.

The client computing devices 14(1)-14(n), the database monitoring server 16, the web application server 18, and the data servers 20(1)-20(n) each may include a central processing unit (CPU) or processor, a memory, and an interface or I/O system, which are coupled together by a bus or other link, although each could comprise other numbers and types of elements and components, such as configured control logic to execute one or more aspects of this technology. Each of the client computing devices 14(1)-14(n) may submit an HTTP request for data or operations from the web application server 18 through the traffic management computing device 12 and may receive HTTP responses, although other numbers and types of requests and responses can be transmitted and received and other types and numbers of functions could be performed.

The database monitoring server 16 may interact with the traffic management device 12 to receive one or more attributes extracted from the HTTP request along with a timestamp and may use the attributes and timestamp to correlate one or more subsequent flows associated with the HTTP request to one or more of the data servers 20(1)-20(n), although other numbers and types of functions can be performed.

The web application server 18 may receive and process the one or more HTTP requests or other requests from one or more of the client computing devices 14(1)-14(n) to execute one or more SQL queries or requests to obtain responsive data or other information from one or more of the data servers 20(1)-20(n), although other numbers and types of functions can be performed. Each of the data servers 20(1)-20(n) store content, such as files and directories, in relational databases and perform other operations, although other numbers and types of servers or other computing device which could have other numbers and types of functions and/or store other data could be used.

Although an example of the traffic management computing device 12, the plurality of client computing devices 14(1)-14(n), the database monitoring server 16, the web application server 18, and the data servers 20(1)-20(n) are described herein, other types and numbers of devices could be used and each of these devices could be implemented in other configurations and manners on one or more of any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
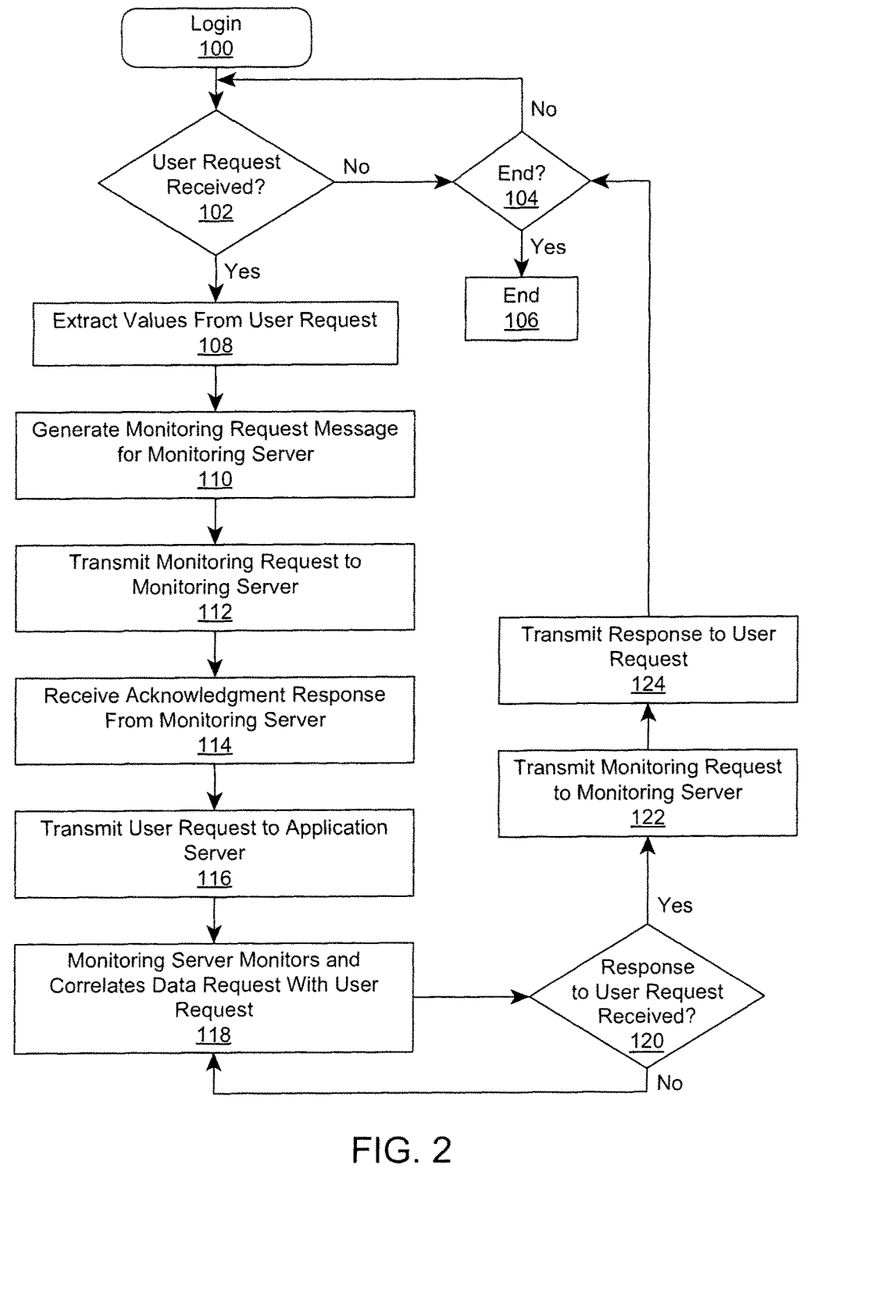
FIGS. 2 and 3 are flow and functional diagrams of a method for identifying network traffic characteristics to correlate and monitor one or more subsequent flows to generate an audit trail.

An exemplary method for identifying network traffic characteristics to correlate and monitor one or more subsequent flows to generate an audit trail will now be described with reference to FIGS. 1-3. In step 100, the traffic management computing device 12 monitors for when one of the client computing devices 14(1)-14(n) performs a login request and submits a login form containing username or other login identifier, although other manners for monitoring a login, such as the traffic management computing device 12 providing an initial login page, could be used.

In step 102, the traffic management computing device 12 determines whether a received user request, such as an HTTP request by way of example only, with a username or other login credentials can be associated with one of the client computing devices 14(1)-14(n), although other types of requests from other types of devices could be received. If in step 102, the traffic management computing device 12 can not associate the received user request with the username or other login credentials with one of the client computing devices 14(1)-14(n), then the No branch is taken to step 104.

In step 104, the traffic management computing device 12 determines whether this exemplary method should end, such as when the user at the one of the client computing devices 14(1)-14(n) logs out or stops browsing by way of example only, although other manners for determining when this method should end can be used. If in step 104 the traffic management computing device 12 determines this exemplary method should end, then the Yes branch is taken to step 106 where this exemplary method ends. If in step 104 the traffic management computing device 12 determines this exemplary method should not end, then the No branch is taken back to step 102 as described earlier.

If back in step 102, the traffic management computing device 12 can associate a received user request with a username or other login credentials with one of the client computing devices 14(1)-14(n), then the Yes branch is taken to step 108. For illustration purposes in FIG. 3 for this particular example, the user request is provided by the client computing device 14(1), although other types of devices could provide the request.

In step 108, the traffic management computing device 12 extracts a client identification, such as one or more of a login username, IP address, authentication credentials, and an authentication cookie value by way of example only, a session identification, and one or more values from the received user request, although other types and amounts of data can be extracted.

Figure 3:
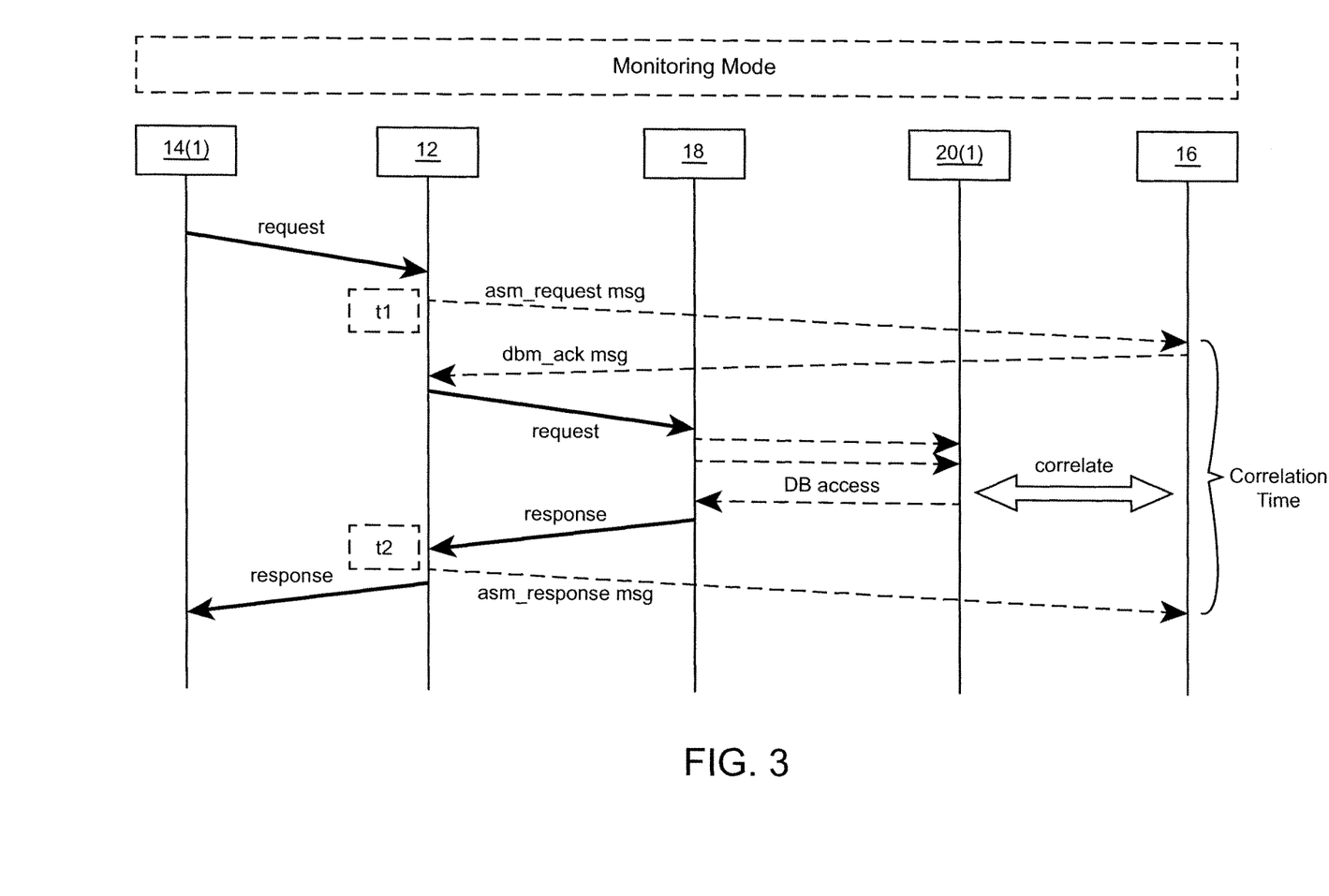

In step 110, the traffic management computing device 12 generates a monitoring request message, shown by way of example only as "asm_request.msg" in FIG. 3. The generated monitoring request message includes a timestamp and the extracted client identification, session identification, and one or more values from the received user request, although other types of messages with other data may be generated. In step 112, the traffic management computing device 12 transmits the generated monitoring request to the database monitoring server 16 over an unencrypted TCP socket over a secure internal LAN provided by communication network 21(2), although other manners of transmitting this message over other types of connections and networks can be used. Once the monitoring request has been received by the database monitoring server 16, the database monitoring server 16 generates and transmits a monitoring acknowledgement response to the traffic management computing device 12.

In step 114, the traffic management computing device 12 receives the monitoring acknowledgement response, shown by way of example only as "dbm_ack.msg" in FIG. 3, from the database monitoring server 16.

In step 116, the traffic management computing device transmits the received user request to the application server 18. The application server 18 receives the user request forwarded from the traffic management computing device 12 and may issue one or more SQL requests for data or other operations from one or more of the data servers 20(1)-20(n), although other types and numbers of requests, such as an XML query, XPATH, or an WS security request by way of example only, to other types and numbers of devices could be used. For illustration purposes in FIG. 3 for this particular example, the SQL requests from the application server 18 are provided to the data server 20(1), although the requests could be transmitted to other devices to obtain the requested data.

In step 118, with the information in the generated monitoring request, the database monitoring server 16 is now able to monitor and correlate data flows between the application server 18 and one or more of the data servers 20(1)-20(n) which are associated with the received user request, although types of flows of requests and/or responses to other types of servers and computing devices could be monitored and correlated. The database monitoring server 16 also may apply one or more stored access or other policies to the data flows between the application server 18 and one or more of the data servers 20(1)-20(n), although the access or other policies could be applied to other types of flows to other types of servers and computing devices. Additionally, the database monitoring server 16 is able to generate an audit trail associate with the user request and the correlated SQL or other requests.

In step 120, the traffic management computing device 12 determines whether a response to the user request has been received. If in step 120, the traffic management computing device 12 determines a response to the user request has not been received, then the No branch is taken back to step 118 as described earlier and then database monitoring server 16 continues to monitor and correlate data flows between the application server 18 and one or more of the data servers 20(1)-20(n). If in step 120, the traffic management computing device 12 determines a response to the user request has been received, then the Yes branch is taken back to step 122.

In step 122, the traffic management computing device 12 generates and transmits a monitoring response message, shown by way of example only as "asm_response.msg" in FIG. 3, to the database monitoring server 16. When the database monitoring server 16 receives the monitoring response message it stops any further monitoring and correlation of data flows between the application server 18 and one or more of the data servers 20(1)-20(n) for the previously received user request. In step 124, the traffic management computing device 12 transmits the user response received from the application server 18 to the requesting one of the client computing devices 14(1)-14(n) which is shown by way of example only in FIG. 3 as client computing device 14(1) and then proceeds to step 104 as described earlier.

Figure 4:
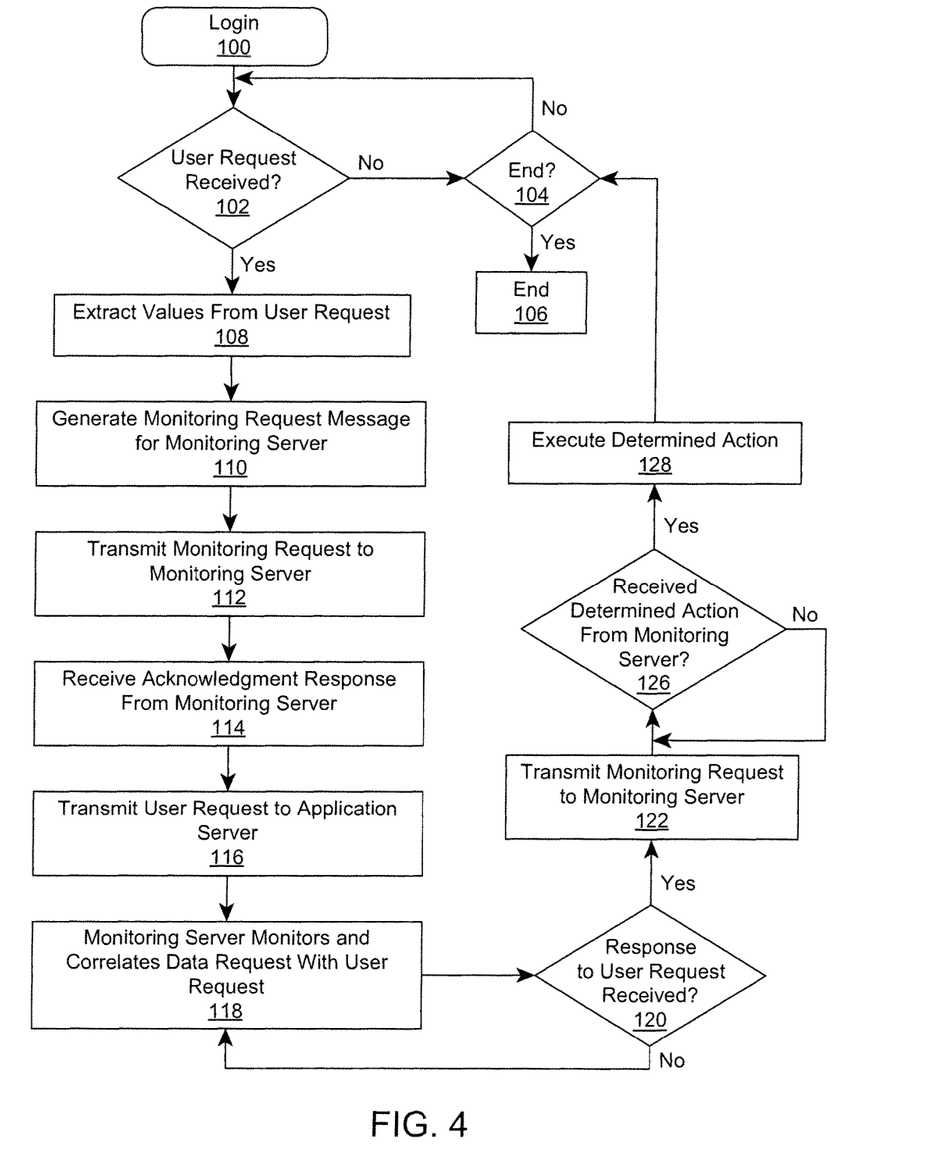
FIGS. 4 and 5 are flow and functional diagrams of a method for identifying network traffic characteristics to correlate and manage access to one or more subsequent flows.

An exemplary method for identifying network traffic characteristics to correlate and manage access to one or more subsequent flows will now be described with reference to FIGS. 1, 4 and 5. This exemplary method is the same as the exemplary method described with reference to FIGS. 1-3, except as illustrated and described herein. Steps in the exemplary method described with reference to FIGS. 1, 4, and 5 which are like those in the exemplary method described earlier with reference to FIGS. 1-3, will have like reference numerals and will not be described again.

In step 122, the traffic management computing device 12 generates and transmits a monitoring response message, shown by way of example only as "asm_response.msg" in FIG. 3, to the database monitoring server 16. However, in this exemplary method the traffic management computing device 12 now waits for a subsequent action message from the database monitoring server 12 before determining what action to take with respect to the HTTP response to the received user request from one of the client computing devices 14(1)-14(n), which is shown by way of example only in FIG. 5 as client computing device 14(1). The database monitoring server 12 can monitor the data flows between the application server 18 and one or more of the data servers 20(1)-20(n) and generate one or more commands. In this example, the received action can comprise allowing this HTTP response to be transmitted to the requesting one of the client computing devices 14(1)-14(n), logging this HTTP response for auditing or other purposes in a memory storage device, reporting this HTTP response to one or more designated entities, quarantining or otherwise blocking this HTTP response from being transmitted to the requesting one of the client computing devices 14(1)-14(n), if for example an SQL injection is detected, and terminating this HTTP response, although other types and numbers of operations based on a received command can be executed. The blocking may be at the web-application level, at the level of the transaction, or later for the user or user session and the commands may be based on the data access policy comprising one or more SQL injection policies in the database monitoring server 16.

Figure 5:
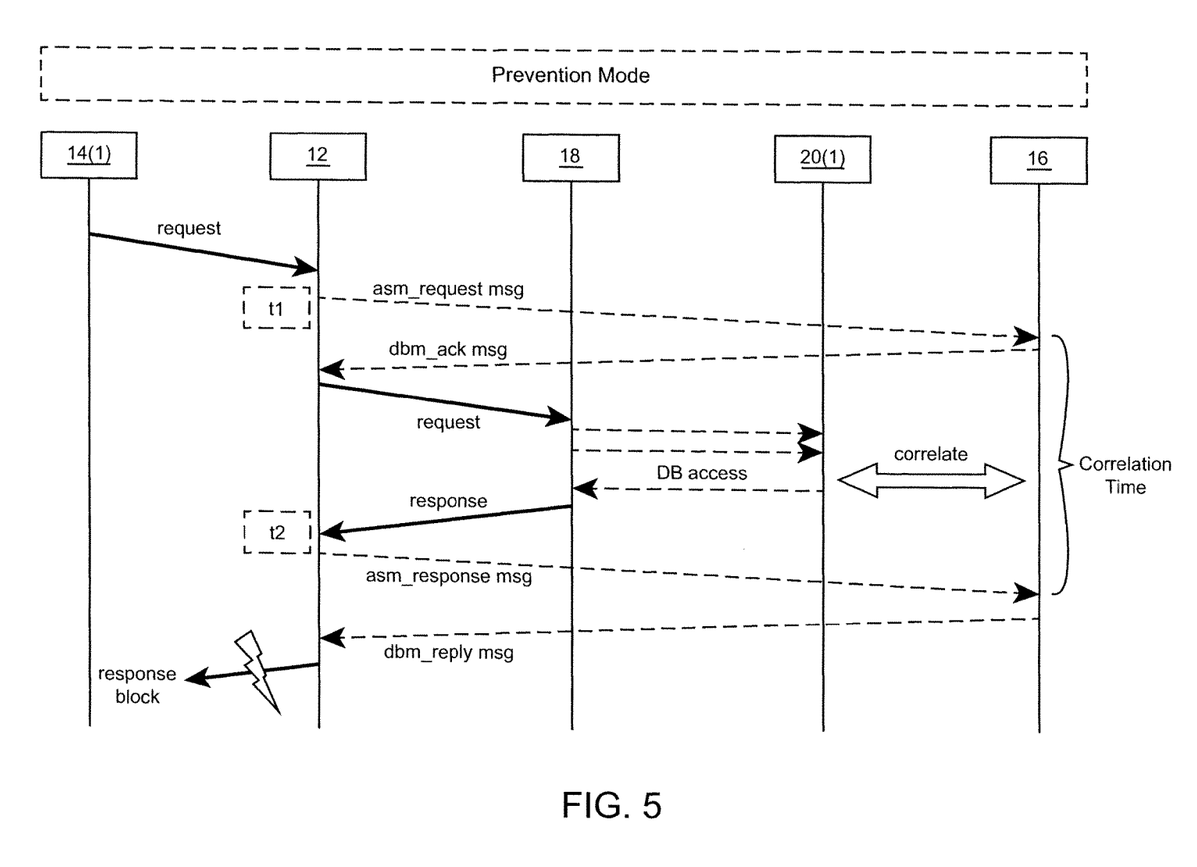

In step 126, the traffic management computing device 12 determines whether an action message, shown by way of example only as "dbm_reply.msg" in FIG. 5, from the database monitoring server 16 has been received. If in step 126, the traffic management computing device 12 determines an action message from the database monitoring server 16 has not been received, then the No branch is taken back to the start of step 126, although other options are available, such as ending this method after a set period of time if a command message is not received. If in step 126, the traffic management computing device 12 determines an action message from the database monitoring server 16 has been received, then the Yes branch is taken to step 128.

In step 128, the traffic management computing device 12 executes the specified action in the message with respect to the HTTP response to the received user request, although other types and numbers of operations can be performed. As noted earlier, these actions can, by way of example only, include allowing, logging, reporting, quarantining, or terminating the response to the received user request. Once the traffic management computing device 12 has completed the action with respect to the HTTP response based on the received command, this exemplary method returns to step 104 as described earlier.

Accordingly, as illustrated and described in the exemplary methods herein, this technology provides effective methods, non-transitory computer readable medium, and devices that identify network traffic characteristics to correlate and manage one or more subsequent flows. With this technology, data access audit trails can be generated that are granular at the data level and also tie in attributes from the web application layer. Additionally, this technology can monitor and effectively alert or terminate a user session deemed to be misbehaving based on a data access policy. Further, this technology helps to secure both application and database environments from threats, such as http://www.f5.com/glossary/distributed-denial-of-service-attack.html SQL injection and cross-site scripting attacks.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for identifying network traffic characteristics to correlate and manage one or more subsequent flows, the method implemented by a network traffic management system comprising one or more network traffic apparatuses, client devices, or server devices, and, the method comprising:

transmitting a monitoring request comprising a client identification and a session identification extracted from an HTTP request received from a client computing device and a timestamp to a monitoring server to correlate one or more subsequent flows associated with the HTTP request;

transmitting the HTTP request to an application server after receiving an acknowledgement response to the monitoring request from the monitoring server;

receiving an HTTP response to the HTTP request from the application server;

transmitting a monitoring response message to end the correlation associated with the HTTP request; and performing at least one operation associated with the client identification and a session identification with respect to the received HTTP response when a command message in a response to the monitoring response message is not received before a determined period of time elapses.

2. The method of claim 1, wherein the performing further comprises:

outputting the HTTP response to the requesting client computing device.

3. The method of claim 1, further comprising:

receiving a determined action with respect to the HTTP request from the monitoring server which is based on at least one data access policy, wherein the performing further comprises executing, by the traffic management computing device, the determined action on the HTTP response.

4. The method of claim 3, wherein the determined action comprises one or more of allowing, logging, reporting, quarantining, or terminating, by the traffic management computing device, the output of the HTTP response to the requesting client computing device.

5. The method of claim 1, wherein the monitoring request further comprise one or more request values.

6. A non-transitory computer readable medium having stored thereon instructions for identifying network traffic characteristics to correlate and manage one or more subsequent flows comprising machine executable code which when executed by at least one processor, causes the processor to:

transmit a monitoring request comprising a client identification and a session identification extracted from an HTTP request received from a client computing device and a timestamp to a monitoring server to correlate one or more subsequent flows associated with the HTTP request;

transmit the HTTP request to an application server after receiving an acknowledgement response to the monitoring request from the monitoring server;

receive an HTTP response to the HTTP request from the application server;

transmit a monitoring response message to end the correlation associated with the HTTP request; and perform at least one operation associated with the client identification and a session identification with respect to the received HTTP response when a command message in a response to the monitoring response message is not received before a determined period of time elapses.

7. The medium of claim 6, wherein the performing further comprises outputting the HTTP response to the requesting client computing device.

8. The medium of claim 6, further comprising receive a determined action with respect to the HTTP request from the monitoring server which is based on at least one data access policy, wherein the performing further comprises executing the determined action on the HTTP response.

9. The medium of claim 8, wherein the determined action comprises one or more of allowing, logging, reporting, quarantining, or terminating the output of the HTTP response to the requesting client computing device.

10. The medium of claim 6, wherein the monitoring request further comprise one or more request values.

11. A network traffic manager apparatus, comprising memory including programmed instructions stored in the memory and one or more processors configured to be capable of executing the programmed instructions stored in the memory to:

transmit a monitoring request comprising a client identification and a session identification extracted from an HTTP request received from a client computing device and a timestamp to a monitoring server to correlate one or more subsequent flows associated with the HTTP request;

transmit the HTTP request to an application server after receiving an acknowledgement response to the monitoring request from the monitoring server;

receive an HTTP response to the HTTP request from the application server;

transmit a monitoring response message to end the correlation associated with the HTTP request; and perform at least one operation associated with the client identification and a session identification with respect to the received HTTP response when a command message in a response to the monitoring response message is not received before a determined period of time elapses.

12. The apparatus of claim 11, wherein the performing further comprises outputting the HTTP response to the requesting client computing device.

13. The apparatus of claim 11, wherein the one or more processors are further configured to be capable of executing the programmed instructions stored in the memory to receive a determined action with respect to the HTTP request from the monitoring server which is based on at least one data access policy, wherein the performing further comprises executing the determined action on the HTTP response.

14. The apparatus of claim 13, wherein the determined action comprises one or more of allowing, logging, reporting, quarantining, or terminating the output of the HTTP response to the requesting client computing device.

15. The apparatus of claim 11, wherein the monitoring request further comprise one or more request values.

16. A network traffic management system, comprising:
one or more traffic management apparatuses, client devices, or server devices, the network traffic management system comprising memory including programmed instructions stored thereon and one or more processors configured to be capable of executing the stored programmed instructions to:

transmit a monitoring request comprising a client identification and a session identification extracted from an HTTP request received from a client computing device and a timestamp to a monitoring server to correlate one or more subsequent flows associated with the HTTP request;

transmit the HTTP request to an application server after receiving an acknowledgement response to the monitoring request from the monitoring server;

receive an HTTP response to the HTTP request from the application server;

transmit a monitoring response message to end the correlation associated with the HTTP request; and perform at least one operation associated with the client identification and a session identification with respect to the received HTTP response when a command message in a response to the monitoring response message is not received before a determined period of time elapses.

* * * * *